No. 895,070.

PATENTED AUG. 4, 1908.

E. H. BURNES.
TROLLEY POLE MOUNT.
APPLICATION FILED JULY 27, 1904.

2 SHEETS—SHEET 1.

Witnesses:
Raphael Netter
A. S. Dunham

Edwin H Burnes Inventor by Kerr, Page & Cooper Attys.

No. 895,070.

PATENTED AUG. 4, 1908.

E. H. BURNES.
TROLLEY POLE MOUNT.
APPLICATION FILED JULY 27, 1904.

2 SHEETS—SHEET 2.

Witnesses:
Raphaël Netter
S. S. Dunham

Inventor
Edwin H. Burnes
by Kerr, Page & Cooper Attys.

UNITED STATES PATENT OFFICE.

EDWIN H. BURNES, OF AMSTERDAM, NEW YORK, ASSIGNOR OF ONE-THIRD TO PHOEBUS H. ALEXANDER, OF AMSTERDAM, NEW YORK.

TROLLEY-POLE MOUNT.

No. 895,070.    Specification of Letters Patent.    Patented Aug. 4, 1908.

Application filed July 27, 1904. Serial No. 218,365.

*To all whom it may concern:*

Be it known that I, EDWIN H. BURNES, a citizen of the United States, residing at Amsterdam, in the county of Montgomery, State of New York, have invented certain new and useful Improvements in Trolley-Pole Mounts, of which the following is a specification, reference being had to the drawings accompanying and forming part of the same.

My invention relates to devices for mounting trolley poles, and has for its object to provide a mount with springs of such character and so arranged that the force of the springs, when the pole is from any cause released or disengaged from the line, does not cause the pole to fly upward with a sudden and powerful strain upon the mount and its connections, but causes the upward impulse of the springs to be exerted with gradual diminution so that the strain on the mount is cushioned and the connections thereby relieved of any destructive effects.

To these and other ends the invention consists in the novel features, arrangements of parts, and combinations of elements hereinafter described, and more particularly set forth in the claims.

It will be understood that where I refer to a trolley "pole" in the following description and claims I mean any device for carrying the current from the line to the car motors.

Figure 1:
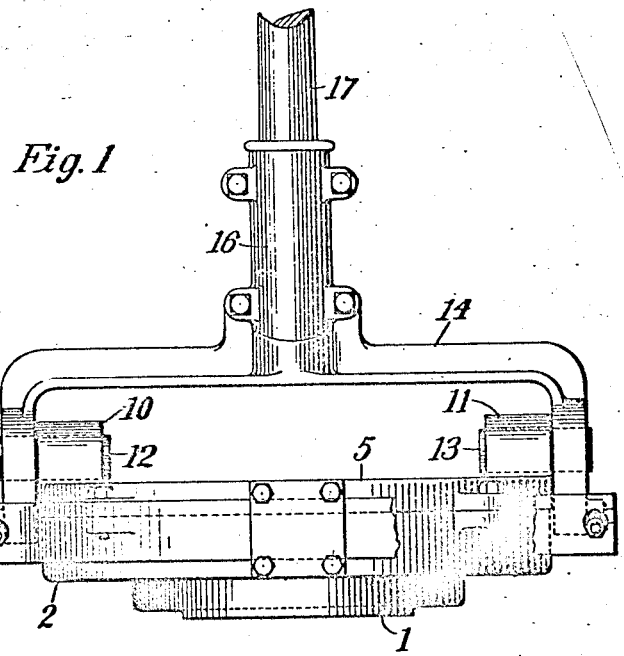
Figure 2:
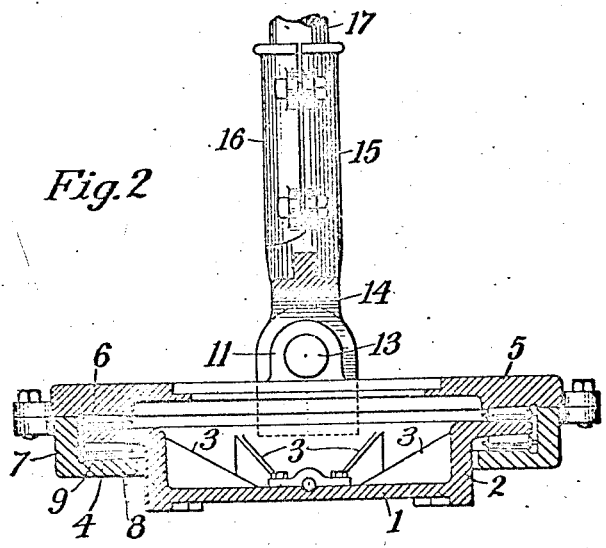
Figure 3:
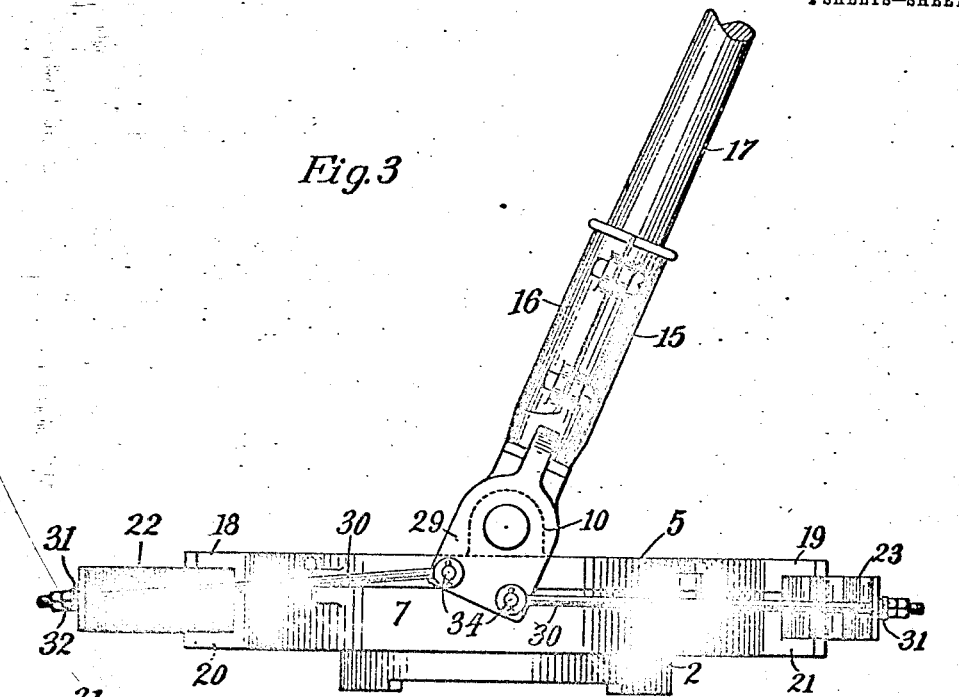
Figure 4:
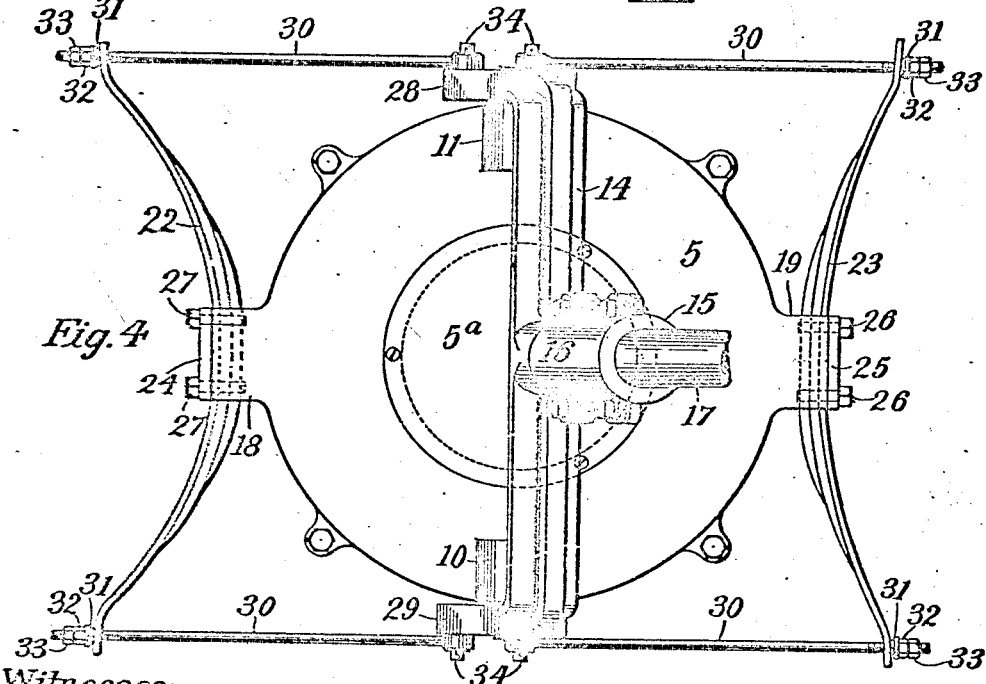

A convenient embodiment of the invention is shown in the accompanying drawings, in which Figure 1 is a side elevation. Fig. 2 is a central section at right angles to the plane of Fig. 1. Fig. 3 is a side elevation at right angles to that of Fig. 1, and Fig. 4 is a plan view.

The base of the mount is indicated by 1. It is secured to the roof or roof-frame of the car in any convenient manner, (not shown), and consists preferably of circular bottom plate having an upstanding flange or collar 2, strengthened by suitable gussets or braces, as 3. Around the collar is an outstanding flange 4, tapering outwardly, as shown, to form a bearing for the rotatable carrier.

The carrier consists of an annular plate 5, having a bearing surface 6, inclined oppositely to the upper surface of the flange 4. Secured in any convenient way to the lower side of the plate 5 is a collar 7, with an inwardly extending flange 8, having a bearing surface 9, inclined oppositely to the lower surface of the flange 4. Interposed between the plate 5 and the flange 4, and between the latter and the flange 8, is a convenient number of conical anti-friction rollers, distributed around the circumference of the parts mentioned. To protect the roller bearings from dirt, water, etc., a removable cover 5$^a$ may be provided for the opening in the plate 5.

On opposite sides of the plate 5 are lugs, 10, 11, in which are mounted pivots 12, 13 carrying the bracket 14. The latter is provided with a tubular socket, preferably made in two parts, 15, 16, secured by bolts or other suitable means, to permit the ready insertion and removal of the trolley pole 17.

On the plate 5, midway between the lugs 10, 11, are studs or bosses 18, 19, registering with similar bosses 20, 21, on the collar 7, for the purpose of carrying the springs 22, 23. The latter are of the leaf type, as shown, consisting of any suitable number of leaves, as for example three each, and are removably secured to the supporting bosses by plates 24, 25, and screws 26, 27.

The ends of the springs are connected to the bracket ears 28, 29, by rods 30. The latter carry conical washers 31, which coact with the holes in the spring ends to form a species of universal joint, permitting free movement of the parts, as indicated in Fig. 3. The washers are held on the rods by nuts 32 and lock nuts 33. By setting the nuts at different positions on the rods the tension of the springs may be adjusted, as will be readily understood. The rods are connected to the bracket-ears, preferably at the corners of the latter by means of pivots 34.

From the foregoing the operation of the device will be clear. The springs are constructed or adjusted so as to hold the pole in an inclined position, as shown. When drawn down to engage the trolley wire, both springs are flexed and the contact wheel is held firmly but yieldingly against the wire. When the wheel is suddenly released, the springs carry it back to its original position, but with decreasing force since the tension of the springs is constantly decreasing. When the normal position of the pole is reached, if its momentum is sufficient to carry it farther it again encounters the resistance of the springs; but the tension thereof is now increasing, on account of the shorter leaves coming into operation. The pole is therefore checked with gradually increasing force, until it is finally brought to rest with but few oscillations and without slamming or sudden strains on the mount mechanism. It is also readily reversed, the mount turning easily and smoothly on its rollers. The width of the yoke or bracket 14 between its pivots also materially reduces the strains on the pivots produced by transverse flexure of the pole or in turning the mount to reverse the pole.

The device herein shown I consider a convenient embodiment of my invention, but the latter may of course be embodied in other and widely varying forms without departure from its proper scope.

What I claim is:

In a device of the kind described, the combination of a rotatable base member 5, a pair of upstanding lugs 10, 11, on opposite sides thereof, a trolley pole yoke 14 having depending ears 29 pivoted to the lugs, a pair of bosses 18, 19, on opposite sides of the base member midway between the said lugs, leaf springs 22, 23, secured at their middle points to the said bosses, and rods 30 secured to the ends of the leaf springs and pivoted to the ears of the trolley pole yoke on opposite sides of and below the pivots of said ears, as set forth.

EDWIN H. BURNES.

Witnesses:
C. A. STROEBEL,
HARRY HOWARD.